United States Patent [19]
Sewell

[11] Patent Number: 5,493,396
[45] Date of Patent: Feb. 20, 1996

[54] HIGH RESOLUTION RING LASER GYROSCOPE READOUT

[75] Inventor: Wesley C. Sewell, Dunedin, Fla.

[73] Assignee: Honeywell Inc., Minneapolis, Minn.

[21] Appl. No.: 159,420

[22] Filed: Nov. 30, 1993

[51] Int. Cl.[6] .................................................. G01C 19/66
[52] U.S. Cl. ........................................................ 356/350
[58] Field of Search ................................ 356/350; 372/94

[56] References Cited

U.S. PATENT DOCUMENTS

| | | | |
|---|---|---|---|
| 3,373,650 | 3/1968 | Killpatrick | 356/350 |
| 3,390,606 | 7/1968 | Podgorski | 356/350 |

FOREIGN PATENT DOCUMENTS

| | | | |
|---|---|---|---|
| 9012287 | 10/1990 | WIPO | 356/350 |

Primary Examiner—Samuel A. Turner
Attorney, Agent, or Firm—Craig J. Lervick

[57] ABSTRACT

A high resolution ring laser gyro readout is accomplished by attaching the readout detectors signals to appropriate circuitry that allows a digital signal processor to sample the signals coming out of the readout sensor. The digital signal processor can then provide sufficient processing to determine the phase and frequency characteristics of these output signals which are indicative of the rate of rotation and the direction of rotation of the laser block 10. By sampling at a rate that greatly exceeds the maximum anticipated readout frequency, the resolution of the present invention is greatly enhanced. Furthermore, the readout system of the present invention is capable of handling certain irregularities in the gyro's output.

22 Claims, 2 Drawing Sheets

HIGH RESOLUTION RING LASER GYROSCOPE READOUT

FIELD OF THE INVENTION

The present invention relates to a readout device for use with a ring laser gyroscope. More specifically, the readout device provides a high accuracy readout system for determining the rate of rotation of the ring laser gyroscope.

BACKGROUND OF THE INVENTION

King laser angular rate sensors, or ring laser gyros, are well known in the art for measuring angular rotation. The ring laser gyroscope (RLG) is presently used in many navigation systems for aircraft, missiles, etc. In summary, the RLG utilizes two counterpropagating light beams which resonate in a planar closed-loop path. Rotation of the RLG about an axis normal to the plane containing the two counterpropagating light beams causes a difference in the effective pathlength of these light beams. Due to the difference in the effective pathlength of the two counterpropagating beams, a shift in the resonant frequencies for each beam occurs (i.e., the resonant frequency of one beam increases while the resonant frequency of the other beam decreases). This shift in resonant frequency can then be measured as a direct indicator of angular rotation. Ring laser gyroscopes are more specifically described in U.S. Pat. No. 3,373,650 to Killpatrick and U.S. Pat. No. 3,390,606 to Podgorski.

As is very well known in the art, when the two counterpropagating beams have a difference in frequency, this frequency difference can be measured by combining the two optical signals and creating an interference pattern. Several arrangements are used to cause the optical signals to be extracted from the resonant cavity and combined to form an interference pattern. These arrangements include appropriate reflective and transmissive surfaces to cause the combined optical signals to be projected upon an appropriate optical sensor.

In order to detect the interference pattern, generally two optical sensors are placed in a position to receive the combined optical signals (interference pattern). If two optical sensors are used to detect the interference pattern (each sensor positioned 90° apart with respect to the interference pattern) the direction of the interference pattern can also be detected, thus indicating the direction of rotation. From these two optical signals, a pair of pseudo sine waves is generated, each pseudo-sine wave being indicative of the interference pattern projected upon the sensitive surface of the optical sensor.

In prior art readout systems, the pseudo sine waves are then fed to zero crossing detectors which detect the zero crossings of each of these pseudo-sine waves and measure the time period between zero crossings. By knowing the time period between zero crossings, a signal can be generated indicative of the frequency of the interference pattern. As the frequency of the interference pattern is directly indicative of rotation, this frequency measurement can be used as a measure of angular rotation. From this frequency measurement and appropriate calculations, angular rotation can subsequently be communicated to a navigation system.

Other methods to detect the frequency of the interference pattern have been used, including peak detectors in conjunction with zero crossing detectors. This method results in sampling four times every cycle which will help account for non-regularities in the pseudo sine wave signal. However, this method still results in considerable inaccuracy due to the amount of time between the sampling points for each pseudo sine wave signal. Further inaccuracies result from the non-uniformity of the output signals (pseudo sine wave signals).

SUMMARY OF THE INVENTION

It is an object of the present invention to provide a high resolution RLG readout for providing an accurate measurement of angular rotation. This object is achieved by increasing the sampling rate at which the output signal is sampled and performing appropriate signal processing.

It is a further object of the present invention to improve readout accuracy by increasing the readout resolution to at least twice that of any presently used readout system. It is a further object to sample or monitor the readout signal at a rate of at least twice that presently used by other readout systems.

These objects are achieved by attaching sample-and-hold circuitry to the output of a pair of optical sensors. This sample-and-hold circuitry can be triggered by a control device to sample the output signal at an indicated sample time. The voltage level at a sample-and-hold output is indicative of the voltage level at the optical sensors at the predetermined sample time. The sample-and-hold circuitry provides its output to a pair of flash analog-to-digital converters. The flash analog to digital converters sense the voltage level output by the sample-and-hold circuitry and provide a digital signal output indicative of this voltage level. The digital output signals can then be provided to a digital signal processor for performing signal processing to extract the necessary information from the analog-to-digital converter outputs. For example, the readings could be compared with a look-up table to determine phase change over time.

By sampling the output signals at a rate of at least eight times the maximum frequency of the readout signal a high resolution readout is achieved. Sampling at this rate assures a minimum of eight samples per cycle. Furthermore, it is very likely that many more samples will be received per cycle.

BRIEF DESCRIPTION OF THE DRAWINGS

Further objects and advantageous of the present invention can be seen by reading the following detailed description in conjunction with the drawings in which.

DETAILED DESCRIPTION OF THE INVENTION

Figure 1:
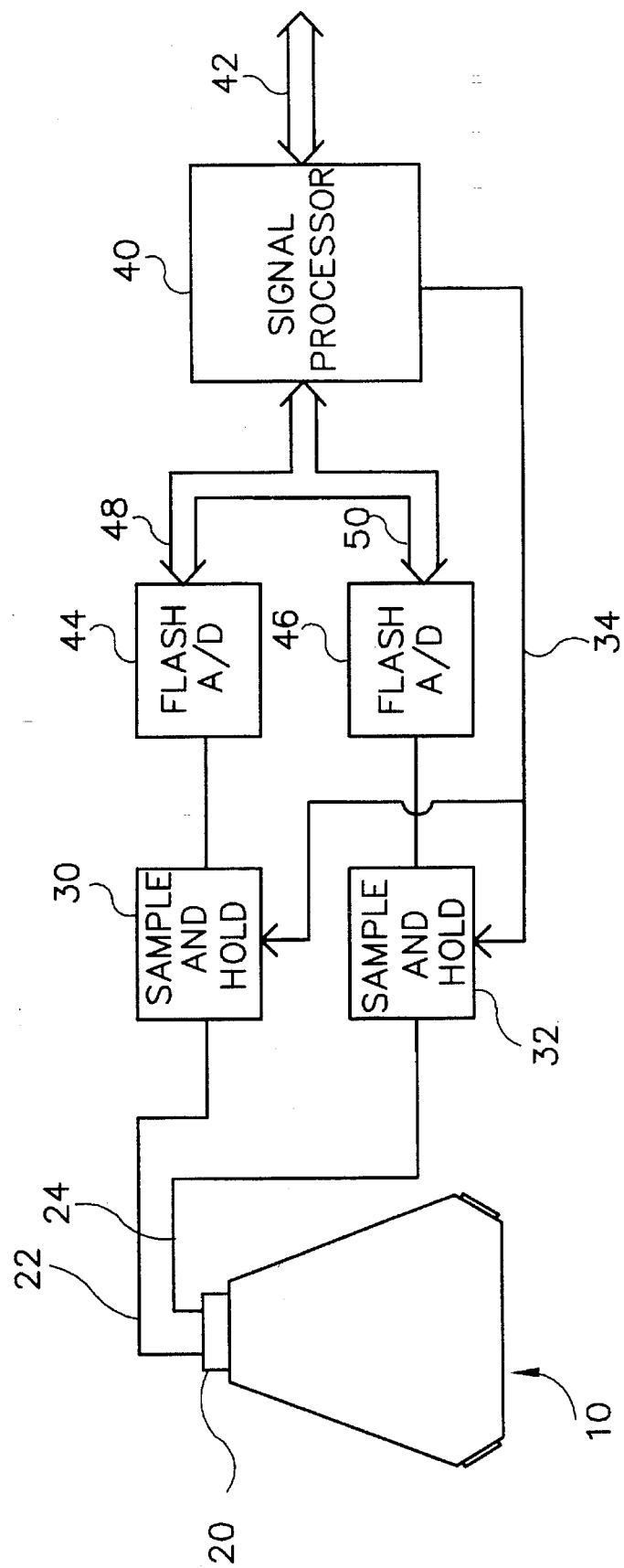
FIG. 1 is a block diagram showing the ring laser gyro and the elements making up the high resolution readout system.

The present invention provides a high resolution readout by performing sufficient signal sampling and signal analysis to accurately detect the readout signal from a ring laser gyroscope. Referring now to FIG. 1, there is shown a block diagram illustrating the readout of the present invention.

A laser gyroscope block 10 supports two counterpropagating optical signals. These signals travel in a closed-loop path around an interior cavity of block 10. Positioned upon one corner of gyro block 10 is a readout 20. It is generally understood by those skilled in the art that readout 20 comprises sufficient optics to allow portions of the two counterpropagating optical signals to emerge from the interior cavity of gyro block 10. The two optical signals are then combined through the use of any necessary optical elements and the combined optical signals are projected upon an optical sensor.

In the preferred embodiment, the optical sensor element actually consists of two optically sensitive elements, each providing an output signal indicative of the optical signals projected upon a sensitive surface thereof As is well known in the art, the two optically sensitive elements are positioned to receive the combined optical signal while also being 90° apart, thus causing one output signal to lead the other output signal by 90°. This forced phase difference due to positioning of the optically sensitive elements, allows for the differentiation between right-hand and left-hand rotation of gyro block 10.

Figure 2A:
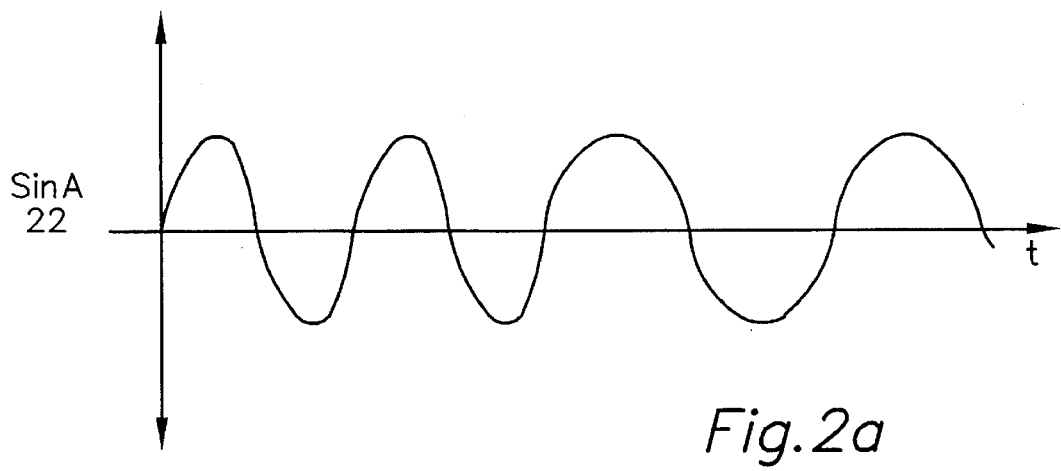
FIG. 2 is a graphical illustration of exemplary signals being sampled by the present high resolution ring laser gyro readout system.
Figure 2B:
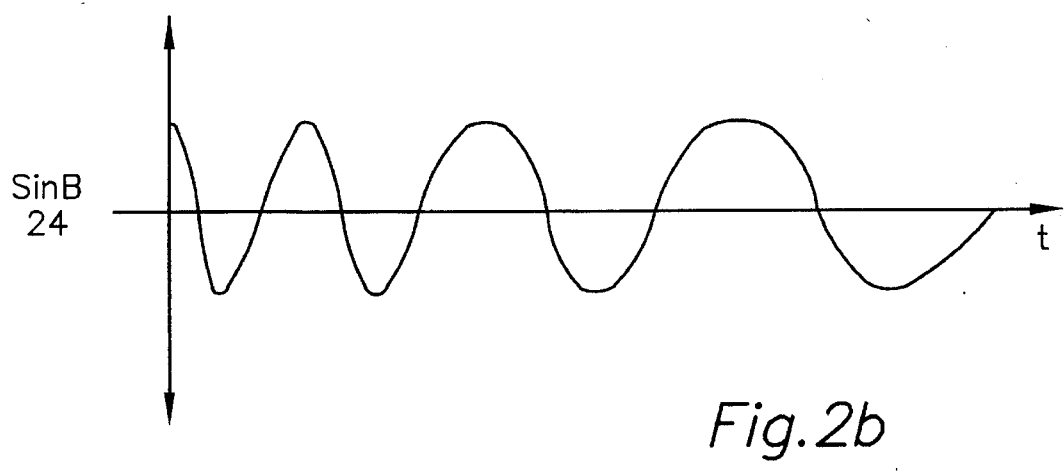
Figure 2C:
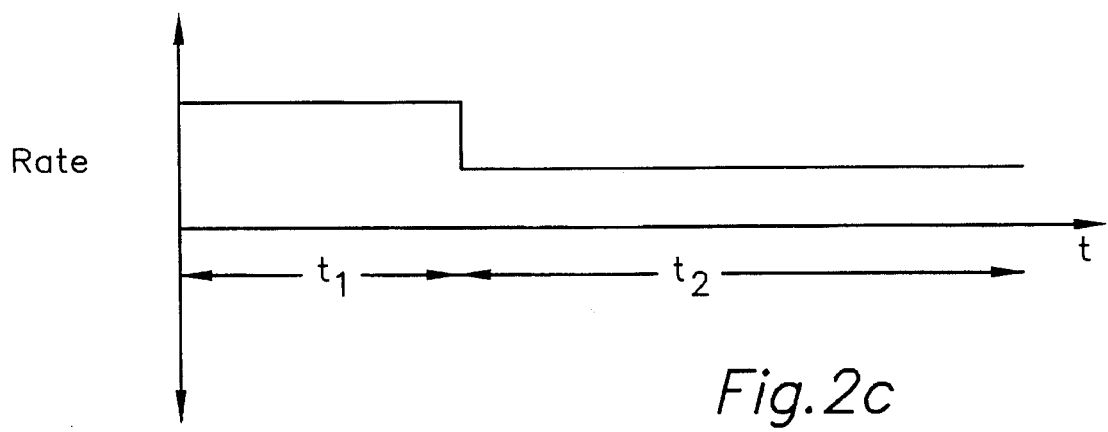

Now referring to FIG. 2 while still referring to FIG. 1, the readout has a first output 22 and a second output 24. First readout output 22 (sine A) is the output from the aforementioned first optically sensitive element while second readout output 24 (sine B) is the output from a second optically sensitive element. First readout output 22 is connected to the input of a first sample-and-hold circuit 30. Similarly, second readout output 24 is connected to the input of a second sample-and-hold circuit 32. Both first sample-and-hold circuit 30 and second sample-and-hold circuit 32 have a trigger input provided by a digital signal processor. Further details about trigger input 34 and signal processor 40 will be disclosed at a later point in the present application.

Connected to the output of first sample-and-hold circuit 30 is a first flash analog-to-digital converter (A/D converter) 44. Similarly, connected to an output of second sample and hold circuit 32 is a second flash A/D converter 46. Both first flash A/D converter 44 and second flash A/D converter 46 receive an analog input and produce a digital signal indicative of the analog input at an A/D converter output. More specifically, first flash A/D converter 44 provides a digital signal at a first digital interface 48 while second flash A/D converter 46 provides a digital signal indicative of the analog signal at its input at second A/D digital interface 50. Both first A/D digital interface 48 and second A/D digital interface 50 are connected to a digital signal processor 40. Digital signal processor 40 can then receive the digital signals at the interfaces and perform necessary signal processing. Digital signal processor 40 has an output interface 42 for communicating information to external systems (not shown). One example of a commonly used external system is an inertial navigation system.

In operation, readout 20 provides two pseudo sine wave signals on first readout output 22 and second readout output 24, respectively. At the appropriate time, digital signal processor 40 provides a trigger signal on sample-and-hold trigger input 34 to both first sample-and-hold circuit 30 and second sample-and-hold circuit 32. Once these trigger signals are received, first sample-and-hold circuit 30 samples the signal at its input and produces an analog output equal to the sampled analog voltage. Similarly, second sample-and-hold circuit 32, when triggered, samples the analog voltage at its input and produces an analog output equal to the sampled analog voltage.

The analog outputs from first sample-and-hold circuit 30 and second sample- and-hold circuit 32 are held constant until the next sample trigger is received. The outputs from first sample-and-hold circuit 30 and second sample-and-hold circuit 32 are provided to first flash A/D converter 44 and second flash A/D converter 46, respectively. These A/D converters 44, 46 can then convert the analog signals received from first sample-and-hold circuit 30 and second sample-and-hold circuit 32 to digital signals indicative of the respective analog voltage level. These digital signals are produced at first A/D digital interface 48 and second A/D digital interface 50 and can then be provided to digital signal processor 40. Digital signal processor 40 is then receives the digital signals and continues to trigger the sample-and-hold circuits 30, 32 to cause sampling of the readout signals present at first readout output 22 and second readout output 24.

As will be recognized by those skilled in the art, by sampling the readout signals 22, 24 at a sufficient rate and doing sufficient signal processing information such as frequency and phase can be extracted from the sampled signals. This frequency and phase information is then directly indicative of the rate of rotation of laser gyro block 10. Specifically, rotation rate information can be determined by calculations utilizing the appropriate scale factor for the gyroscope.

It is anticipated by the present invention that the rate of sampling be at least eight times that of the maximum anticipated readout signal frequency. This maximum anticipated readout signal frequency can be derived from the maximum anticipated input rate of rotation. For example, if it is anticipated that gyro block 10 will be subjected to a maximum rotation rate of 500° per second and it is also known that the scale factor for the output signal from readout 20 is approximately 2 arc seconds per cycle, it can be calculated that the maximum readout output frequency is equivalent to approximately 900 kHz (500° per second× 3600 arc seconds per degree ÷2 arc seconds per cycle). From this it is necessary for digital signal processor 40 to sample at a rate of eight times the maximum readout output. In the above example, this is equal to 7.2 MHz. By sampling at such a sampling rate, the system can be assured that it will get at least eight data points for each cycle in the output signal. From these eight data points, the output signals can be appropriately determined, thus allowing a determination of the rotation and direction of rotation of the laser gyro block 10. It will then be recognized that many more data points will be received per cycle when the input rate is below its maximum.

To derive the necessary information from the received digital signals, digital signal processor 40 can perform many functions. For example, the obtained readings may be checked against a look-up table to determine the phase change over a given period of time. Alternately, the digital signals could be mathematically fit to anticipated waveforms. All of these methods are within the scope of the present invention.

Advantages of this method of readout determination include much more flexibility and signal interpretation which could be induced by vibration and/or other operational characteristics causing irregularities in the output signal. These irregularities can be more easily dealt with by the readout system of the present invention than can be dealt with by readout systems of the prior art.

Referring now to FIG. 2, there is shown exemplary signals that may be seen on first readout output 22 and second readout output 24. During time period $T_1$ the gyro is subjected to a first input rate which causes the outputs from first readout output 22 and second readout output 24 to be of a first frequency indicative of this rate. At the beginning of time period $T_2$, the input rate changes causing the frequency of the output signals to change. While not shown in this Figure, should the direction of rotation change, a phase change would occur causing sine A to lead sine B as opposed to the situation shown in FIG. 2.

In the present invention, two readout outputs have been shown (first readout output 22 and second readout output 24). It should be understood that the principles of the invention pertaining to rotation rate detection are equally applicable to systems with more or less readout output signals.

Having described the present invention in considerable detail, it will be understood by those skilled in the art that the present invention can be altered without departing from the principles of the present invention. We claim all embodiments coming within the scope and spirit of the following claims.

What is claimed is:

1. A readout device for use with a ring laser gyroscope having a first readout sensor and a second readout sensor wherein the first readout sensor and the second readout sensor produce a periodic signal, the readout device comprising:

first sample and hold means attached to a first readout sensor, the first sample and hold means for sampling the first readout sensor and producing a first sample and hold signal indicative of the sampled first readout sensor;

second sample and hold means attached to the second readout sensor, the second sample and hold means for sampling the second readout sensor and producing a second sample and hold signal indicative of the sampled second readout sensor;

first flash conversion means attached to the first sample and hold means for receiving the first sample and hold means output and producing a first conversions means output, the first conversion means output being a digital signal indicative of the level of the first sample and hold means output;

second flash conversion means attached to the second sample and hold means for receiving the second sample and hold means output and producing a second conversions means output, the second conversion means output being a digital signal indicative of the level of the second sample and hold means output;

signal processing means attached to the first flash conversion means and the second flash conversion means for receiving the first flash conversion means output and the second flash conversion means output over a predetermined period of time and producing a gyro output signal based upon the first flash conversion means output and the second conversion means output wherein a sample signal is provided to the first and second sample and hold means a multiple number of times so that sampling occurs a plurality of times in each cycle of the periodic signal.

2. The readout device of claim 1 wherein the first sample and hold means samples the first readout sensor at a predetermined frequency.

3. The readout device of claim 1 wherein the second sample and hold means samples the second readout sensor at a predetermined frequency.

4. The readout device of claim 2 wherein the predetermined frequency is greater than eight times a maximum readout frequency.

5. The readout device of claim 3 wherein the predetermined frequency is greater than eight times a maximum readout frequency.

6. A readout device for detecting the rotation rate of a ring laser gyroscope wherein the ring laser gyroscope has two counterpropagating optical signals which, when combined, form a laser output signal, the readout device comprising:

optical sensing means for detecting the output signal, the optical sensing means having an output for producing a periodic sensor signal indicative of the laser output signal;

sample and hold means attached to the optical sensing means output, the sample and hold means for detecting the sensor signal at a sample time and producing a sample and hold output which is indicative of the detected sensor signal and holds the sample and hold output constant for a predetermined hold time; and flash conversion means attached to the sample and hold means for receiving the sample and hold output and producing a conversion means output indicative of the sample and hold output; and processing means attached to the flash conversion means for receiving the conversion means output and determining the characteristics of the conversion means output over a predetermined time, the processing means further having a timing output attached to the sample and hold means to control the sample time wherein a sample signal is provided to the sample and hold means a multiple number of times so that sampling occurs a plurality of times during each period of the periodic sensor signal.

7. The readout device of claim 6 wherein the optical sensing means comprises a photodetector which produces the sensor signal responsive to the laser output signal.

8. The readout device of claim 6 wherein the processing means produces an initiate signal at the timing output causing the sample and hold means to sample and hold the sensor signal when the initiate signal is received.

9. The readout device of claim 8 wherein the processing means produces the initiate signal at a predetermined frequency, causing the sample and hold means to sample the sensor signal at the predetermined frequency.

10. The readout device of claim 9 wherein the predetermined frequency is at least eight times a predicted frequency of the sensor signal.

11. The readout device of claim 9 wherein the predetermined frequency is at least 7.2 MHz.

12. The readout device of claim 10, further comprising:

second optical sensing means having a second optical sensing means output for producing a second sensor signal in response to the laser output;

second sample and hold means attached to the second optical sensing means output, the second sample and hold means for detecting the second sensor signal at the sample time and producing a second sample and hold output which is indicative of the detected second sensor signal and holds the second sample and hold output constant for a predetermined hold time, the second sample and hold means having a timing input attached to the processing means timing output so as to allow the processing means to control the sample time; and second flash conversion means attached to the second sample and hold means for receiving the second sample and hold output and producing a second conversion means output indicative of the second sample and hold output, the second conversion means output connected to the processing means thus allowing the processing means to receive the second conversion means output and determine the characteristics of the second conversion means output over a period of time, 13. The readout device of claim 12 wherein the optical sensing means comprises a photodetector which produces the sensor signal responsive to the laser output signal.

14. The readout device of claim 6 wherein the predetermined frequency is at least 7.2 MHz.

15. A rotational sensor for sensing rotation in inertial space, comprising:

means for supporting two counterpropagating optical signals such that the two signals propagate about an axis, the optical signal supporting means further allowing a portion of the optical signals to be combined to form an output signal, the output signal is then projected out of the optical signal supporting means;

optical sensing means positioned to receive the output signal on an optically sensitive portion thereof and produce an output signal indicative of the intensity patterns of the output signal, the sensor signal being a periodic electrical signal;

sample and hold means having an input attached to the optical sensing means so as to receive the sensor signal, the sample and hold means further having a timing input for receiving a timing signal, wherein the sample and hold means samples the sensor signal when a sample signal is received on the timing input and produces a sample and hold output signal substantially equivalent to the sensor signal and holds the sample and hold signal at that level for a period of time;

conversion means for receiving the sample and hold output signal and producing a conversion means output in response to the received sample and hold output, the conversion means output being a digital signal indicative of the voltage level of the received sample and hold output; and control means for receiving the conversion means output and producing the sample signal at a predetermined frequency so that sampling can occur a plurality of times in each period of the output signal, the control means for further evaluating the conversion means output over a predetermined period of time so as to evaluate the characteristics of the output signal over the predetermined period of time, the characteristics of the output signal then being indicative of rotation in inertial space.

16. The rotational sensor of claim 15 wherein the optical sensing means comprises a photodetector which produces the sensor signal responsive to the output signal.

17. The rotational sensor of claim 15 wherein the predetermined frequency is at least eight times a predicted frequency of the sensor signal.

18. The rotational sensor of claim 15 wherein the predetermined frequency is at least 7.2 MHz.

19. The rotational sensor of claim 15, further comprising:

second optical sensing means also positioned to receive the output signal on an optically sensitive portion thereof and to produce a second sensor signal indicative of the intensity patterns of the output signal, the second sensor signal being an electrical signal; and second sample and hold means having an input attached to the second optical sensing means so as to receive the second sensor signal, the second sample and hold means further having a timing input for receiving the timing signal from the control means, wherein the second sample and hold means samples the second sensor signal when the sample signal is received on the timing input and produces a second sample and hold output signal substantially equivalent to the second sensor signal and holds the sample and hold signal at that level for a period of time;

second conversion means for receiving the second sample and hold output signal and producing a second conversion means output in response to the received second sample and hold output, the second conversion means output being a digital signal indicative of the voltage level of the received second sample and hold output, wherein the second conversion means output is connected to the controller means so as to allow the controller means to evaluated the output signal as received by the second optical sensor means.

20. The rotational sensor of claim 19 wherein the second optical sensing means comprises a photodetector which produces the second sensor signal responsive to the output signal.

21. The rotational sensor of claim 19 wherein the predetermined frequency is at least eight times a predicted frequency of the sensor signal.

22. The rotational sensor of claim 21 wherein the predetermined frequency is at least 7.2 MHz.

* * * * *